UNITED STATES PATENT OFFICE.

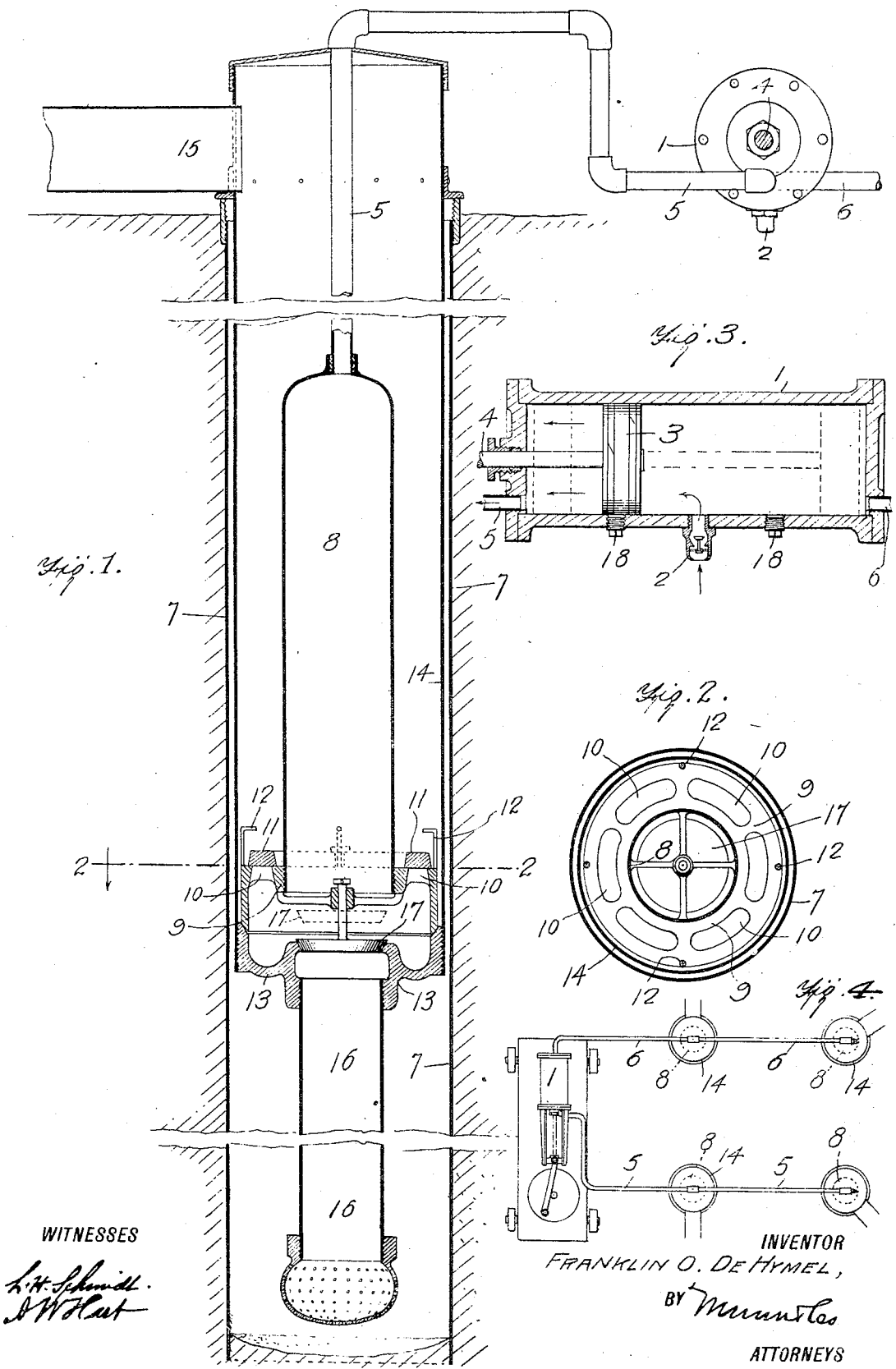

FRANKLIN OSCAR DE HYMEL, OF SAN ANTONIO, TEXAS, ASSIGNOR, BY DIRECT AND MESNE ASSIGNMENTS, OF ONE-FOURTH TO BART C. DE WITT, OF SUTTON COUNTY, TEXAS, ONE-HALF TO CATHERINE DE WITT DE HYMEL, OF SAN ANTONIO, TEXAS, ONE-EIGHTH TO JAMES CORNELL, OF SUTTON COUNTY, TEXAS, AND ONE-EIGHTH TO O. F. SEARGEANT, OF KINNEY COUNTY, TEXAS.

COMBINED PNEUMATIC LIFT AND FORCE PUMP.

1,060,826.   Specification of Letters Patent.   Patented May 6, 1913.

Application filed May 14, 1912. Serial No. 697,183.

*To all whom it may concern:*

Be it known that I, FRANKLIN OSCAR DE HYMEL, a citizen of the United States, and a resident of San Antonio, in the county of Bexar and State of Texas, have invented a Combined Pneumatic Lift and Force Pump, of which the following is a specification.

In the vast arid region lying in the western portion of the United States and the Gran Mesa Central, or Great Central Valley, of Mexico, agricultural development is only practicable through irrigation, and, although an inexhaustible supply of water exists at a depth of five to forty or more feet and is available for use by digging wells, thus far an economical, easily operated, efficient, and otherwise satisfactory power or machine has not been provided for raising the water.

After much study and necessary experiment with working means, I have perfected a machine that fulfils all requirements, especially in respect to simplicity and economy of construction, strength, durability, ease of transportation, and lifting a great volume of water in a short time by cheap power, preferably by use of draft animals, which are everywhere available.

The construction, arrangement, and operation of the machine or apparatus embodying my invention are as hereinafter described and illustrated in the accompanying drawings, in which—

Figure 1 is a vertical section of that portion of the apparatus which is located in a well, its connection with an air pump being shown in elevation. Fig. 2 is a cross section on line 2—2 of Fig. 1. Fig. 3 is a longitudinal section of an air suction and force pump. Fig. 4 is a diagrammatic plan view illustrating the invention as applied in connection with a series of wells.

In connection with the water pump proper, I use an air suction and force pump which comprises a cylinder 1 provided with one or two air inlet valves 2—see Fig. 3—and a reciprocating piston 3 having a rod 4 which, in practice, is connected with gearing adapted to be operated by a draft animal, or by a motor, as conditions may favor. These parts are, in practice, preferably mounted upon a truck adapted for attachment of a draft animal for convenience of hauling from one point to another where irrigation is required. Air pipes 5 and 6 are connected with the respective ends of the cylinder 1 and extend to wells, as shown in Fig. 4.

The construction of the portion of the apparatus located in a well will be understood from Fig. 1. The same is shown inclosed in a metal well casing 7, and is preferably supported therefrom by a detachable connection at the top. The air pipe 5 connects with the top of an air-vacuum cylinder and water receiver 8 whose lower end screws into a hollow casting 9 having a series of openings 10 surrounding the cylinder—see Fig. 2. Upon the portion provided with these openings is seated an annular valve 11 arranged in guides 12. The lower edge of the hollow casting 9 is beveled and seats upon the similarly formed upper edge of a hollow casting 13 which is screwed into a pipe 14 that extends upward and is supported on the well casing. This pipe has at the top a lateral water-discharge pipe 15, that will in practice deliver into an irrigating ditch or a storage tank. A water suction or lift pipe 16 is connected with and pendent from the lower casting 13 and extends into water in the well. A check valve 17 seats downward in casting 13. The two castings 9 and 13 form a water chamber which, in practice, is immersed in, or located within a few feet of, the water, so that the latter will rise readily into it when a vacuum is formed in the chambers.

The following will now be understood as the operation of the apparatus described. Suppose the piston 3 to be at or near the left hand end of the pump cylinder 1, and it begins to travel to the right, it is apparent that air will be drawn out of the pipe 5 and cylinder 8, or, in other words, a vacuum will be created in the latter, so that water will rise in the pipe 16 past the valve 17 and gradually fill the chamber formed by the castings 9, 13, and also the chamber of cylinder 8. When the piston 3 reverses, or moves back to the left, the air previously taken into the pump cylinder 1 will be expelled, and thus drive out of cylinder 8 the water which has been previously raised into it, it being understood that such water will raise the valve 11 and flow into the pipe 14 and will be discharged through the lateral pipe 15.

In Fig. 3, the pump cylinder 1 is shown provided with a series of openings closed by removable plugs 18. I thus provide for attachment of air-inlet valves at different distances from the ends of the cylinder, so that air may be admitted and suction cut off at different points in the stroke of the piston, according to the distance or height to which water is to be driven or raised. Thus, by locating a single air inlet valve centrally, or by locating two valves nearer the ends of the cylinder 1, at points between the middle and ends, I secure a variation in expulsive effect as well as in suction or lift. I therefore propose to arrange the valves in one way or the other according to requirements, particularly the height or distance to which water is to be elevated and discharged into a ditch or storage tank. It will be understood that the part 14 constitutes practically a water-discharge pipe, although the cylinder 8 supported within it will be filled and emptied more than once before the casing will overflow. The size or diameter of the casing 14 is, however, a matter of judgment, and it may be contracted to a pipe of comparatively small capacity.

As shown in Fig. 1, the vacuum cylinder 8 is connected not only with the casting 9, but the check valve 17 is attached to the latter, so that all, together with the annular check valve 11 may be raised from the lower casting 13 a short distance, or completely removed from the well, that is to say, out of the pipe 14. The top of the latter is made detachable and tackle may be attached to cylinder 8 for hoisting it, when it is required to effect removal of silt or other foreign matter that has accumulated in the chamber of the hollow castings or in the space above it. If the pipe 14 is filled with water, it will obviously flow downward past valve 17 and thus back into the well casing, upon raising the cylinder 8 and its attachments a few inches, and in so doing the water will in many cases wash out and carry down the obstructing sediment or other foreign matter; but if this does not happen, the cylinder 8 is lifted completely clear of the pipe 14. It will be understood that all the parts inclosed in the well casing 7 may be lowered to any depth required—say to a point within 15 feet of the water.

Fig. 4 shows the air pump connected with a series of wells, the air pipes 5 and 6 being provided with detachable sections which are screwed on the sections connected directly with the pump cylinder 1.

By the means described, I provide an ideal apparatus for raising water from wells from a depth of 5 to 100 or more feet and transmitting it to a considerable distance or to a higher point. The apparatus is particularly available for the semi-arid regions of the West and of Mexico and various parts of the earth in view of its economy and simplicity of construction, its comparatively small cost and ease of transportation and operation. It is particularly important in adaptation for use with draft animals, since these are owned by the small farmer and their use is well understood, whereas gasolene and other engines are not only high in first cost, but considerable knowledge and skill are required for their successful operation.

The apparatus is particularly adapted for irrigating tracts of 10, 20, 50, or even 100 acres and for lifting water from various depths. It may be easily and quickly shifted from one well or a series of wells to another, and thus an effective irrigation maintained throughout the dry months with comparatively little labor and expense.

It will be seen that my invention may be termed single or double in respect to the valve arrangement and the use of vacuum and water chambers and that it is adapted for lifting and driving water from one or more wells or from tanks, lakes, and rivers. The air inlet valve of the pump may be placed at any calculated distance from either end of the cylinder as found necessary for lifting a given volume of water to a given or required height, the valve in such case adjusting itself to varying conditions, since it operates alternately by pressure of air in the cylinder and the vacuum at atmospheric pressure. By the automatic action of the air valve or valves placed at any calculated distance from the ends of the pump cylinder, a given volume of air for forcing water, commensurate with the size or capacity of the cylinder, is obtained. The operation of all the valves is automatic and positive. The pump will lift water practically 25 feet, but, as before intimated, a less distance is desirable.

The air-pump proper hereinbefore described and comprising a reciprocating piston and a cylinder having a series of openings provided with interchangeable screw plugs and air inlet valves has been made the subject of another application Serial No. 724,937.

What I claim is:—

1. In an apparatus for the purpose specified, the portion adapted for use in a well, the same comprising a suspended and removable water pipe, a hollow casting attached to the lower end of the pipe and having a valve seated downward, a vacuum and water cylinder arranged within the said water pipe, and a hollow valved casting secured to the bottom of the latter, the two castings being connected by a separable joint which permits the vacuum and water cylinder and its attachments to be lifted clear, as described.

2. In an apparatus for the purpose specified, the portion adapted for use in a well, the same comprising a suspended and removable water pipe, a valved casting attached to the lower end of the same, a vacuum and water-receiving cylinder arranged within said water pipe and a hollow casting secured to the bottom of the same and having a check valve that forms an attachment of the upper casting, the latter with the attached cylinder and its valve being supported detachably upon the lower casting, as described.

3. In an apparatus for the purpose specified, a water pipe adapted to be located in a well and having a water inlet at its lower end provided with a downwardly seated valve, a vacuum and water-receiving cylinder provided with a downwardly seated valve, the aforesaid valve seated in the water inlet being connected with said vacuum cylinder and the latter and all its attachments being separable from the water pipe, so that they may be raised for removal of sediment, as described.

4. In an apparatus for the purpose specified, the combination with a water pipe having an inlet valve at its lower end, of a vacuum and water cylinder provided with a downwardly seated valve and supported detachably on the lower head of said water pipe, whereby the vacuum cylinder and its attachments may be raised, as described.

FRANKLIN OSCAR DE HYMEL.

Witnesses:
BART C. DE WITT,
AMOS W. HART.